Oct. 27, 1970     W. D. WEAGANT     3,536,822
T-TAP INSULATOR
Filed May 26, 1969
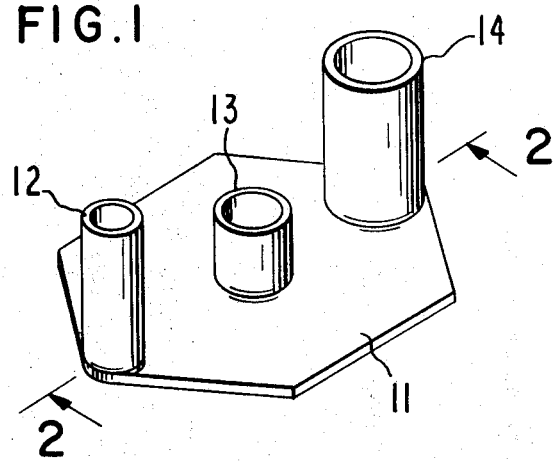
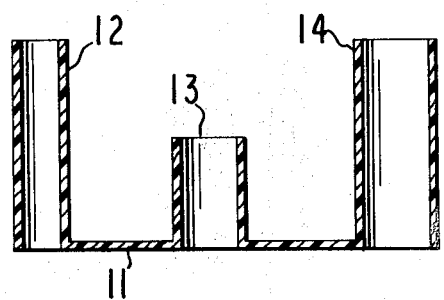
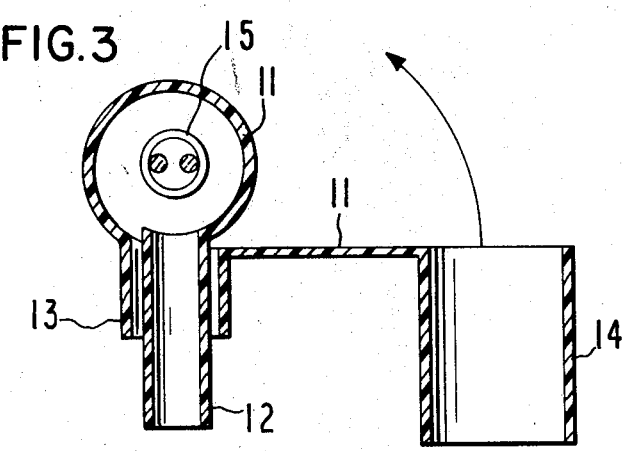
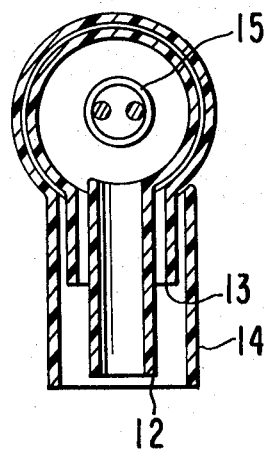
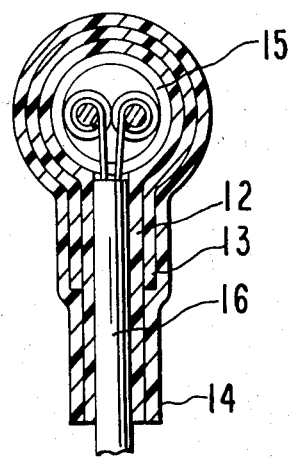
INVENTOR.
WILLIAM D. WEAGANT
BY
*Limbach and Limbach*
ATTORNEYS

United States Patent Office 3,536,822
Patented Oct. 27, 1970

3,536,822
T-TAP INSULATOR
William D. Weagant, Fremont, Calif., assignor to Sigma Industries, Inc., Menlo Park, Calif., a corporation of California
Filed May 26, 1969, Ser. No. 827,681
Int. Cl. H01b 17/00
U.S. Cl. 174—138　　　　　　　　　　　　　　6 Claims

ABSTRACT OF THE DISCLOSURE

An insulator of heat shrinkable material in the form of a sheet with a plurality of hollow, open-ended sleeves extending from one surface thereof is disclosed. The sleeves are aligned along the sheet in the order of increasing internal diameters. The insulator is adapted for wrapping about a main electrical connector with the sleeves fitting over a tap or branch wire in telescoping fashion.

SUMMARY OF INVENTION

This invention relates in general to an electrical junction insulator and sealer, and more particularly to a novel wrap-around, over-lapping heat shrinkable insulator especially useful in insulating and sealing T connection electrical junctions.

It is often necessary to make an electrical connection between a branch wire or tap and a main electrical line or wire by removing a short length of the insulation on the main wire and affixing, as by wrapping and soldering, the end of the branch wire to the main wire. After making such a joint, it is then necessary to recover the main wire and tap at the junction with a suitable insulating material. One very common material used is an insulating electrical tape having at least one sticky surface which is wrapped about the joint a sufficient number of times to create an insulating cover. The strength and permanence of such a taped joint is not good.

The present invention provides a novel T-junction insulator which is strong, easy to apply to the junction, forms a very tight seal and which has a high degree of permanence in use under very adverse conditions. The insulator is formed by a solid sheet of material having a plurality of integral sleeves extending from one surface thereof. The sleeves are in spaced-apart alignment with successively increasing internal diameter sizes from sleeve to sleeve in the line.

In operation, the sheet of material located between the sleeve with the smallest internal diameter and the sleeve with the next larger internal diameter is wound about the main conductor with the sleeves extending radially outward. At the end of one wrap-around, the said next larger or second sleeve is slipped over the smallest or first sleeve in telescopic fashion. The sheet of material located between said second sleeve and the third sleeve with the internal diameter larger than that of the second sleeve is then wrapped around the main wire over the first layer. At the end of this second wrap-around, the third sleeve is slipped over the second sleeve in telescopic fashion. The free end of the branch or tap line may then be fed into the sleeves and the junction made with the main line as by soldering or the like. This may be accomplished since the wrap-around insulator, at this point, is very loosely mounted on the main wire. The insulator is made of a heat shrinkable material so that in response to the application of heat to the wound insulator, the insulator including the main sheet and the sleeves, shrinks up upon itself and upon the main wire and tap wire at the junction to produce a very strong and tight insulation joint. A sealant adhesive can be coated on the inside surface of the insulator before application of the insulator to the joint to provide an even more effective sealed junction.

The material utilized in this insulator has the property of plastic or elastic memory imparted thereto and, during manufacture, the main sheet and sleeves are expanded under heat and pressure to a size greater than normal and cooled while kept under pressure. The insulator will retain its expanded position until after it is wrapped around the junction and heated to above its heat recovery temperature, for example, 250° C., at which time it will shrink to its original size. Examples of such material are found in Weagant U.S. Pat. 3,423,518. Polymeric materials which have been cross-linked by chemical means or by irradiation with high energy electrons or nuclear radiation or non-crystalline polymeric materials with plastic or elastic memory, such as polyurethane, isonomers, etc. can be employed.

The features and advantages of this novel insulator will become more apparent from a perusal of the following specifications taken in connection with the accompanying drawings where:

FIG. 1 is a perspective view of the insulator serving to illustrate one embodiment of the present invention;

FIG. 2 is a longitudinal cross sectional view of the insulator taken along line 2—2 of FIG. 1;

FIG. 3 shows the insulator as it is being applied to an electrical wire or cable;

FIG. 4 shows the insulator in a second stage of its application to the wire; and FIG. 5 is a cross sectional view of the insulator after completion of the application to the wire and after a T-connection has been made between the wire and a branch or tap wire.

Referring now to the drawings, the insulator is formed by a flat sheet 11 of heat shrinkable material having a plurality of spaced-apart hollow open-ended sleeves 12, 13 and 14 integral to the sheet 11. The inner diameters of the sleeves increase in size in order from sleeve 12 to 14. The sheet and sleeves are of a suitable thickness, for example, 1/16". The size of the sheet 11 and the diameter of the sleeves 12, 13 and 14 in the normal or unexpanded state in which they are shown in FIG. 5 are between 1/3 to 1/5 times less than the expanded size as shown in FIG. 4.

Before the electrical T-connection is made between the main electrical wire 15 and the branch wire 16, the portion of the sheet 11 between the smaller diameter sleeve 12 and the next sleeve 13 is wrapped around the main wire 15 and the sleeve 13 slipped over the end of the smaller sleeve 12 in telescopic fashion (see FIG. 3). The sheet 11 is again wrapped around the main wire, overlapping the first layer of sheet 11, the sleeve 14 being slipped over the second sleeve 13 and brought up into contact with the sheet 11 (FIG. 4). This provides a very loose insulator assembly on the main wire.

The free end of the branch wire 16 may then be fed into the center sleeve 12 and both the main wire 15 and the end of wire 16 slipped out one end of the insulator assembly so that the joint between these wires may be made. After the junction is made, the insulator is then centered on the joint.

The necessary heat is then applied to the insulator until the insulator is heated above the heat recovery temperature of the material, at which time the layers of sheet 11 wrapped around the main wire 15 and the overlapping sleeves 12, 13 and 14 contract to their normal size, the insulator being squeezed in on itself and on the wires 15 and 16 (FIG. 5). If desired, the under surface of the sheet 11 and the inner surfaces of the sleeves 12, 13 and 14 may be coated with sealant adhesive such as a semi-thermo plastic sealant so that the insulator, when applied to the junction and heated, becomes more tightly sealed.

Although the embodiment shown has three sleeves, insulators may be made with two sleeves or with four or more sleeves should this be preferred. However, with only two sleeves the seal created between the ends of the body is not under compression of another layer as with three sleeves and is more susceptible to forces that might cause the ends to pull apart and destroy the seal. The insulator may also take other particular shapes but such changes and modifications fall within the spirit of the invention as recited in the appended claims.

What I claim is:

1. An insulator comprising a sheet having a plurality of hollow, open-ended sleeves integral with and extending from one surface of the sheet, the sleeves having different internal diameter sizes, the sheet and sleeves being made of a heat shrinkable material.

2. An insulator as claimed in claim 1 wherein said heat shrinkable material is a polymeric material having elastic memory.

3. An insulator as claimed in claim 1 including an adhesive coated on at least one surface of said sheet and sleeves.

4. An insulator as claimed in claim 1 wherein there are three sleeves, the internal diameter of one sleeve being larger than the outer diameter of a second sleeve, the internal diameter of the second sleeve being larger than the outer diameter of a third sleeve, the sleeves being aligned in spaced-apart relationship and in the order of their internal diameter sizes.

5. An insulator as claimed in claim 4 wherein said heat shrinkable material is a polymeric material having elastic memory.

6. An insulator as claimed in claim 4 including an adhesive coated on at least one surface of said sheet and sleeves.

References Cited

UNITED STATES PATENTS

| 3,035,113 | 5/1962 | Danchuk. | |
| 3,347,976 | 10/1967 | Marks | 174—71 |
| 3,458,649 | 7/1969 | Channell | 174—93 |

FOREIGN PATENTS 626,104  4/1963  Belgium.

LARAMIE E. ASKIN, Primary Examiner

U.S. Cl. X.R.

174—71